United States Patent [19]

Nielsen

[11] Patent Number: 4,777,794
[45] Date of Patent: Oct. 18, 1988

[54] MASS FLOW RATE REGULATION OF PROPELLANT FLUID IN THE FEED SYSTEM OF A BI-PROPELLANT, PRESSURE-FED ROCKET ENGINE

[75] Inventor: Thomas L. Nielsen, Granada Hills, Calif.

[73] Assignee: Rockwell International Corporation, El Segundo, Calif.

[21] Appl. No.: 161,376

[22] Filed: Feb. 22, 1988

Related U.S. Application Data

[63] Continuation-in-part of Ser. No. 4,519, Jan. 20, 1987, abandoned.

[51] Int. Cl.⁴ .............................................. F23R 3/28
[52] U.S. Cl. ........................................ 60/211; 60/240; 236/92 R
[58] Field of Search ............... 236/92 R, 92 A, 93 A, 236/99 J; 60/211, 240, 257–259

[56] References Cited

U.S. PATENT DOCUMENTS

| | | | |
|---|---|---|---|
| 1,235,673 | 8/1917 | Fitts . | |
| 1,656,372 | 1/1928 | Fitts | 236/92 R X |
| 1,927,036 | 9/1933 | Johnson | 236/93 A X |
| 2,097,585 | 11/1937 | Carson | 236/61 |
| 2,187,886 | 8/1938 | Mayo | 236/34 |
| 2,294,163 | 8/1942 | Donnelly et al. | 236/93 A X |
| 2,308,861 | 1/1943 | Clifford | 251/46 |
| 2,630,973 | 3/1953 | Kloth | 236/93 A X |
| 2,829,492 | 4/1958 | Kleinman | 236/92 R X |
| 2,917,067 | 12/1959 | Pearl | 236/92 R X |
| 3,146,947 | 9/1964 | Monroe, Jr. | 236/93 A X |
| 3,252,324 | 5/1966 | Steele | 236/92 R |
| 3,266,236 | 8/1966 | Brehl et al. | 60/211 |
| 3,448,922 | 6/1969 | Courtot | 236/93 |
| 3,659,783 | 5/1972 | Schwartz | 236/93 |
| 3,788,069 | 1/1974 | Schmidt | 60/211 X |
| 3,938,741 | 2/1976 | Allison | 239/75 |
| 4,157,270 | 6/1979 | Martignoni et al. | 60/211 X |
| 4,522,219 | 6/1985 | Ohkata | 137/62 |

*Primary Examiner*—William E. Tapolcai
*Attorney, Agent, or Firm*—H. Fredrick Hamann; Harry B. Field; Lawrence N. Ginsberg

[57] ABSTRACT

A method and apparatus 10 for self-regulating the mass flow rate of a fluid comprises a housing 12 defining an upper chamber 14 and a lower chamber 16, a sealed and pressurized bellows 30 contained within the upper chamber 14, spring bias means 58 contained within the lower chamber 16 and a poppet 32 with a poppet head 40 for defining a fluid passageway 44.

Supply fluid flows through inlet 56, lower chamber 16, fluid passageway 44 and into upper chamber 14. Once in upper chamber 14 the fluid is in heat exchange communication with a fluid in sealed bellows 30. When the mass flow rate of the fluid flowing through upper chamber 14 is effected by either in pressure or a change in temperature, a corresponding change takes place in the fluid in the bellows 30 thus repositioning the poppet head 40 accordingly to redefine the area of passageway 44. Fluid leaves the apparatus through exits 28.

18 Claims, 3 Drawing Sheets

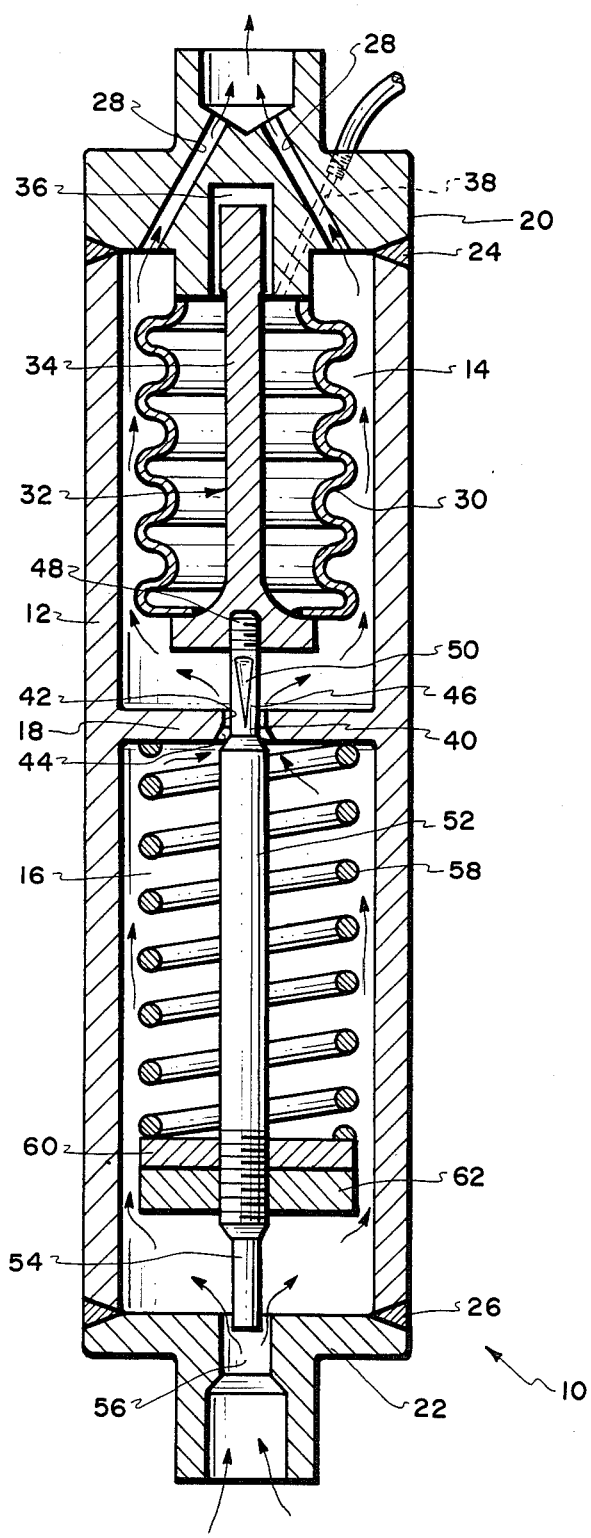
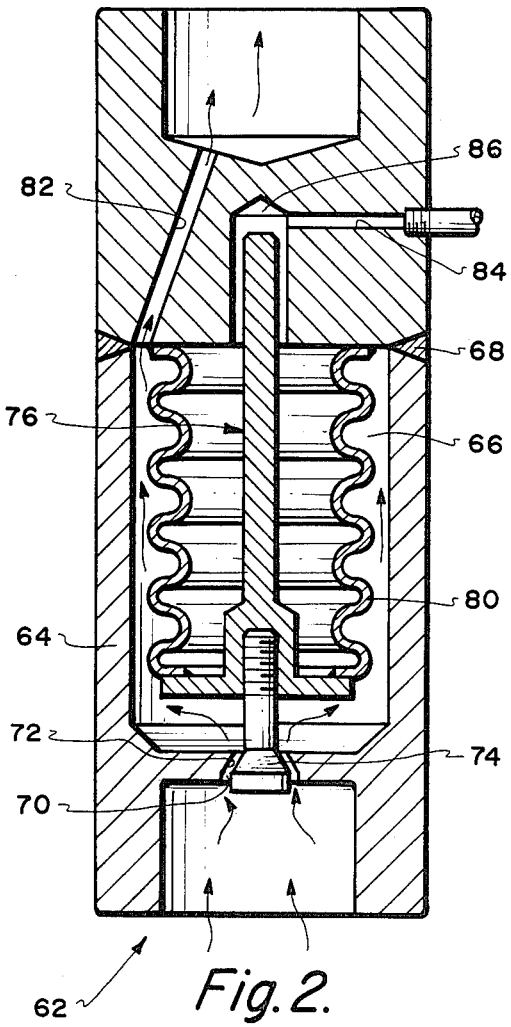
Fig. 1.
Fig. 2.

MASS FLOW RATE REGULATION OF PROPELLANT FLUID IN THE FEED SYSTEM OF A BI-PROPELLANT, PRESSURE-FED ROCKET ENGINE

This is a continuation-in-part of co-pending application Ser. No. 004,519 filed on Jan. 20, 1987, now abandoned.

BACKGROUND OF THE INVENTION

1. Field of the Invention

This invention relates to gaseous state fluid regulation systems and more particularly to a feed system for a bi-propellant, pressure-fed, rocket engine which utilizes a mass flow rate regulator which contains a bellows which is responsive to pressure and temperature changes to activate a poppet which controls the area of a propellant fluid flow passageway.

2. Description of the Prior Art

Pressure regulators that simply control pressure are normally suitable for flow control where there are small temperature fluctuations. Under these conditions, such pressure regulators establish satisfactory and predictable flows. However, these pressure regulators, in only controlling pressure do not compensate for changes in density that occur with temperature changes. In systems, such as the feed system for a fluid fueled rocket engine combustor, where large temperature variations occur, the flow regulators require commensurate monitoring of fluid density changes in order to maintain the desired mass flow rate.

The typical scenario for the feed system of a bi-propellant pressure fed fluid fueled rocket engine combustor is as follows:

The rocket propellants, hydrogen ($H_2$) and oxygen ($O_2$), are stored (and supplied) in tanks that are initially at high pressure and low temperature (2000 psi and 200° R). The pressure and temperature change as the contents of the tanks are consumed and heated during operation (to 300 psi and 600° R). The propellant supply can easily be controlled to a constant feed pressure of 300 psi, but the temperature change of the regulated gas could change the density by a factor of three. Some method is required to compensate for the density change due to temperature.

Two conventional methods for compensating for density changes, a servo regulator system and a multiple valve array system, were evaluated by Rockwell International Corporation for use in the Space Station program. The servo regulator system is designated generally as 100 in FIG. 3. Hydrogen and oxygen propellants, initially stored in tanks 110 which are heated by means 111, flow through conventional pressure regulators 112 which control the feed pressure at approximately 300 psi. The flow of propellants are then regulated by complex servo valves 114 which control the combustor inlet pressure as a function of temperature. As illustrated in the Figure, the servo regulator system 100 requires pressure and temperature transducers 116, 118, power sources 120, and a remotely located electronic servo controller. Each fluid propellant flows through an on/off thruster valve 122 prior to its introduction into the combustor 124.

The multiple valve array system (not illustrated) also requires pressure and temperature transducers, power sources, and an electronic controller. In addition, there are several valves, each having a control orifice. Flow may be controlled by using only one orifice or any combination of orifices.

Both the servo and multiple valve array concepts were found to provide proper control to the rocket combustor, but they would require active control from the central space station computer. The space station complex has many combustors that are located at the extremities to provide the force moments necessary to keep the exhaust away from instruments. All the electronic components, such as the servo valve, multiple valves, and transducers must be connected to computers and require cabling for utilization. Therefore, weight limitations as well as the complexity involved in attempting to utilize several servo valve controls makes a stand-alone, mechanical regulator appealing.

In FIG. 1 of U.S. Pat. No. 4,522,219 issued to I. Ohkata a conventional exhaust valve is shown for exhausting condensed water of steam for a Diesel locomotive which travels in a cold environment. In this valve, fluid flows freely from a steam feed pipe into a valve body. The valve body contains a bellows connected to a rod. The lower end of the rod contains a valve element which opens an exhaust port when the bellows is contracted and closes the exhaust port when the bellows is expanded. When the steam from the feed pipe is partly cooled to produce condensed water, the water flows into the valve body. The relatively cool water cools and contracts the bellows. The valve element therefore moves up opening the exhaust port and allowing the discharge of condensed water.

SUMMARY AND OBJECTS OF THE INVENTION

The principal object of this invention is to provide a method and apparatus for self-regulating the mass flow rate of propellant fluid within the feed system of a bi-propellant, pressure-fed rocket engine which is mechanically simple and provides a fast thermal response time.

Another object is to provide a self-contained mass flow regulator which eliminates electrical controls.

Other objects, advantages and novel features of the present invention will become apparent from the following detailed description of the invention when considered in conjunction with the accompanying drawing.

In its broadest aspects the invention comprises a feed system for a bi-propellant, pressure-fed, rocket engine which utilizes a mass flow rate regulator which contains a housing defining a chamber. The housing has a surface which forms an entrance opening for introducing a supply of fluid to the chamber. The housing also has an exit opening for providing for discharge of the fluid from the chamber. A sealed and pressurized bellows is contained within the chamber and is in heat exchange communication with the fluid flowing through the chamber. The bellows contains a fluid with the same or similar thermodynamic characteristics as the fluid being regulated. A poppet is also located within the chamber and is attached to and adapted to change its position in response to changes in the elongation of the bellows. One end of the poppet terminates with a poppet head which extends into the entrance opening. The housing surface which forms the entrance opening and the poppet head cooperatively define a fluid passageway. The area of the fluid passageway is effected by the position of the poppet head. During operation, when the mass flow rate of fluid flowing through the chamber is effected by either a change in pressure or a change in temperature, a corresponding change takes place in the sealed bellows thus repositioning the poppet accordingly and resulting in the self-regulation of the mass flow rate of the fluid flowing through the regulator.

In its narrower aspects, the housing further defines a second chamber located upstream the first chamber and adjacent the first chamber. This second chamber contains spring bias means for biasing the poppet toward an open position. The mass flow regulator of the present invention eliminates the need for pressure or temperature transducers, electrically controlled valves, wires, or electronic servo controllers. By eliminating these aforementioned external support devices the mass flow regulator of the present invention is particularly applicable for use on future space programs such as the space station.

BRIEF DESCRIPTION OF THE DRAWINGS

FIG. 1 is an elevational cross-sectional view of a preferred embodiment of the mass flow regulator of the present invention including spring bias means.

FIG. 2 is another embodiment of the mass flow regulator which does not utilize a spring bias means.

The same elements or parts throughout the figures are designated by the same reference characters.

DETAILED DESCRIPTION OF THE INVENTION

Figure 3:
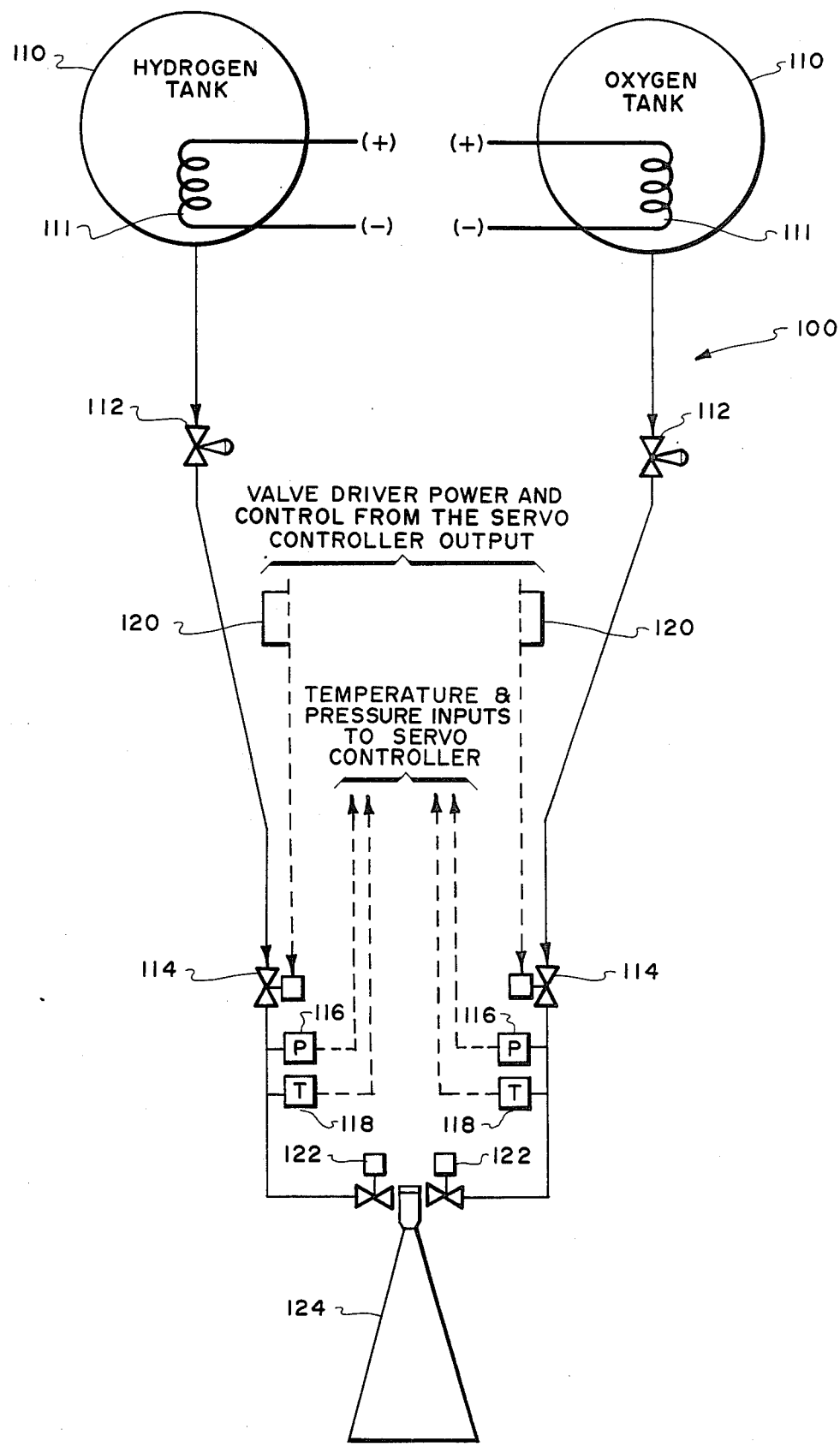
FIG. 3 is a schematic diagram of a conventional bi-propellant, pressure-fed rocket engine feed system, utilizing a servo regulator control scheme.
Figure 4:
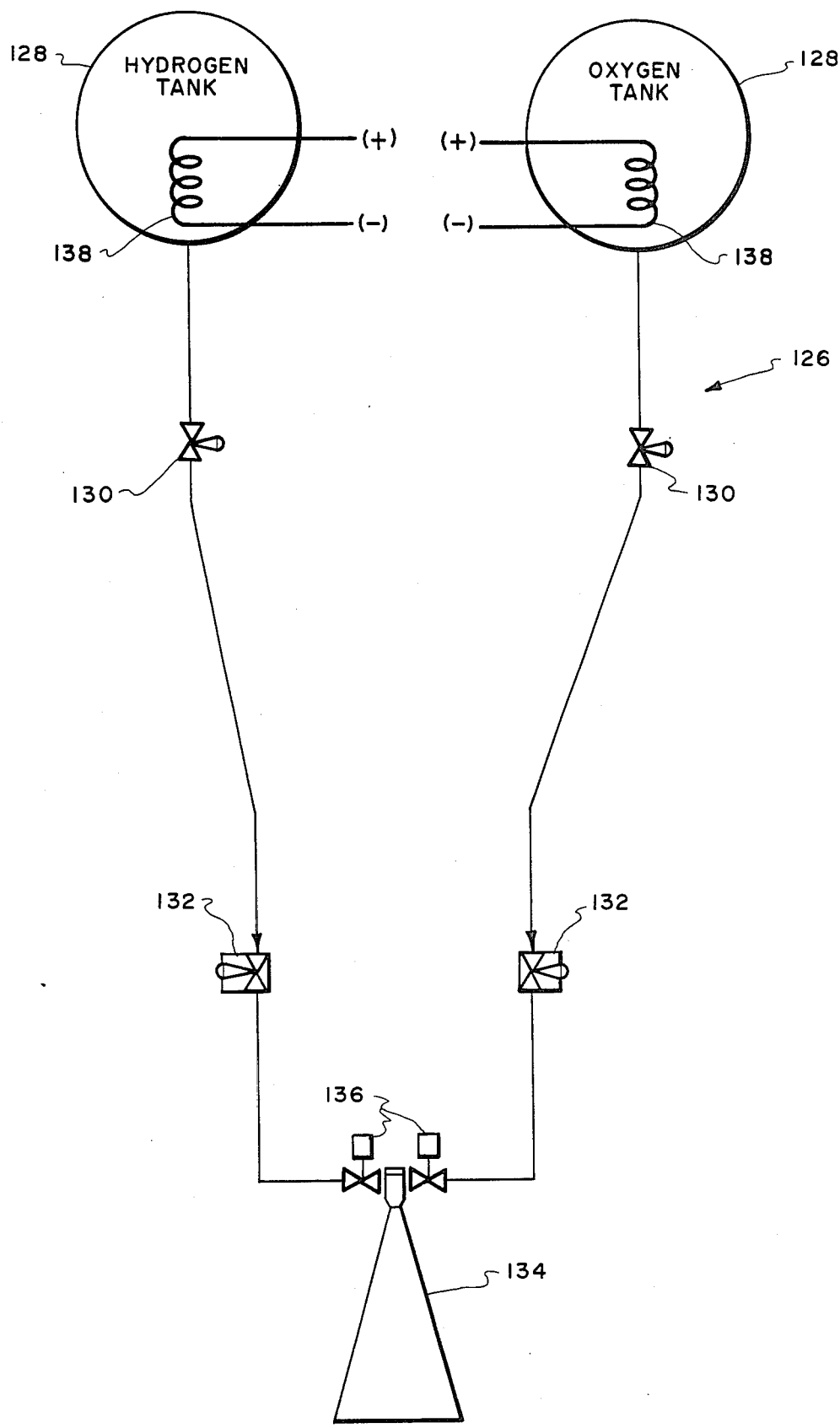
FIG. 4 is a schematic diagram of the bi-propellant, pressure-fed rocket engine feed system of the present invention.

Referring first to FIG. 4, the feed system for the bi-propellant, pressure-fed, rocket engine of the present invention is shown, designated generally as 126. As in the aforementioned conventional feed systems, propellant fluid is directed from tanks 128 through conventional pressure regulators 130 which control the feed pressure to an approximately constant magnitude. Each propellant flow is then directed through a novel mass flow regulator 132 and to the combustor 134. (As in the conventional feed systems on/off thruster valves 136 are also utilized.) Each mass flow regulator 132 is capable of adjusting the combustor inlet pressure as a function of temperature increase as the propellants are heated by means 138.

Referring now to FIG. 1, a preferred embodiment of the mass flow regulator 10 the present invention is designated generally as 10. The constant mass flow rate regulator 10 includes a substantially cylindrical housing 12. The housing 12 is partitioned to define a downstream or upper chamber 14 and an upstream or lower chamber 16. The housing 12 contains a partitioning portion 18 which forms a circular entrance opening for the introduction of a supply flow of fluid to the upper chamber.

For ease of manufacture the housing 12 has end caps 20, 22 which are welded, at locations 24, 26 to the main body of the housing 12. The downstream end 20 of the housing 12 has exit openings 28 for discharge of the fluid from the chamber 14 after it has been regulated. A bellows 30 is attached to the downstream end 20. The bellows 30 extends longitudinally through the chamber 14. A poppet 32 is attached to the bellows 30. A stem 34 of the poppet 32 fits within and is capable of gliding freely within a bore 36 in the downstream end 20 of the housing 12. A conduit 38 through the housing 12 provides a means for pressurizing the bellows 30 to a desired level. The upstream end or lower end of the poppet 32 terminates with a poppet head 40 having a circular cross-section. When the poppet head 40 is moved downward relative to the seat or housing surface 42 an annular fluid passageway 44 is formed as shown in the figure. The upper or downstream portion 46 of the poppet head 40 is tapered so as to provide a variable flow area as the bellows elongates or contracts. Surface 42 is also tapered. The area of the passageway 44 increases as the poppet head 40 is moved downward. The poppet head 40 is threaded, as shown at location 48, to the stem 34. The poppet 32 is formed with a V-groove 50 to also aid in providing the appropriate flow passageway area.

In the preferred embodiments of FIG. 1, the lower end of the poppet head 40 terminates with a shaft 52 which extends into the lower chamber 16. The lower or upstream end of the shaft 52 terminates with a guide 54. The guide 54 fits into an inlet 56 for the apparatus 10. The guide 54 has a sufficiently small cross-sectional area so as not to impede the flow of fluid through inlet 56. A bias spring 58 wound around the shaft 52 preloads the poppet 32 in an open position and biases it toward the upstream direction during operation. If, for example, this apparatus 10 were utilized with a rocket engine combustor then the spring 58 would provide the regulator with a bias force to balance against the fixed chamber pressure. The bias spring 58 opposes a spring cup 60 and an adjusting nut 62 threaded to the shaft 52.

Prior to operation of the regulator 10 the bellows is pressurized at a predetermined level. During operation, the supply fluid flows through the inlet 56 and into the lower chamber 16. The fluid then flows through the fluid passageway 44 formed between the poppet head 40 and partitioning surface 42. It then flows into the upper chamber 14. The fluid discharges through exit openings 28.

Once inside the upper chamber 14 the fluid is in heat exchange communication with the fluid within the bellows. The bellows 30 contains a fluid with the same or similar thermodynamic characteristics as the fluid being regulated. It either contracts, expands or remains stationary as a function of any changes in the pressure and/or temperature of the fluid in the upper chamber 14. Expansion or contraction of the bellows 30 results in positional changes in the poppet 32 and thus changes in the fluid passageway area. Through proper calibration a constant mass flow rate may be achieved.

A second embodiment of the mass flow regulator, designated generally as 62, is illustrated in FIG. 2. In this embodiment, the housing 64 forms only a single chamber 66 and is welded at a single location 68. The spring bias means of the previous embodiment is absent. Supply fluid flows directly through a passageway 70 formed between housing surface 72 and the poppet head 74 of poppet 76. As in the previous embodiment, the fluid then flows into chamber 66 where it is in heat exchange communication with the fluid within bellows 80. It then exits chamber 66 through exit port 82. A bellows pressurizing conduit 84 is shown in fluid communication with a guide bore 86. Preferably, with all embodiments of the present invention a conventional pressure regulator is utilized upstream of the apparatus 10 to minimize the changes in the pressure loads operating on the poppet head.

EXAMPLE

In the scenario described in the "Background of the Invention" for the typical feed system for a fluid fueled rocket engine combustor, $H_2$ and $O_2$ are stored in tanks that are initially at 2000 psi and 200° R. During the process of propellant consumption the contents of the tanks are heated to 600° R and the tanks' pressures are decreased to 300 psi. For each propellant a conventional pressure regulator is utilized upstream of the mass flow regulator of the present invention to hold the pressure of each propellant at a constant pressure of 280 psi thus minimizing the forces caused by variance of the supply pressure to the apparatus 10. The bias spring 58 of the apparatus 10 is sized to compensate for the constant chamber pressure of the rocket engine. The bellows 30 is pressurized so that the total regulated pressure of the apparatus 10 is proper for the prevailing temperature of the regulated propellant. The regulated pressure of the apparatus 10 is then controlled by the pressure in the bellows 30 plus the equivalent pressure of the bias spring 58. The regulated pressure of apparatus 10 will be adjusted by the change in bellows pressure. If at 400° R, the bias spring 58 is sized to maintain a bias pressure of 100 psid and the bellows pressurized to 80 psia, the apparatus 10 would then regulate at the total regulated pressure of 180 psia. Dropping the temperature to 200° R would drop the bellows pressure in proportion to the temperature reduction, i.e. to 40 psia (total regulated pressure of 140 psia). Increasing the temperature of the regulated gas to 600° R would cause a proportional increase in the regulated pressure of bellows 30 (i.e. to 120 psia). In this case the total regulated pressure would be 220 psia. Temperature compensation is reflected on that portion of the regulated pressure contributed by the bellows.

Calibration is carried out by flowing temperature controlled propellant through apparatus 10 at the design inlet pressure and temperature range. With the flow adjusted to planned rates, the regulation pressure of the apparatus 10 is measured and compared to the established acceptable pressure versus temperature values for the device.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a bi-propellant pressure fed rocket engine feed system having a fuel propellant and an oxidizer propellant, each stored in a respective storage tank under high pressure and low temperature for maximizing the propellant densities, a method for maintaining a substantially constant mass flow rate of each propellant fluid into a rocket combustor during the process of propellant consumption, comprising:

flowing each propellant fluid from its storage tank through a conventional pressure regulator, the propellant fluid being discharged from each said conventional regulator being maintained at a respective constant pressure and in a gaseous state, each propellant tank being heated to increase the tank pressure, thus compensating for the pressure losses resulting from the discharge of propellant fluid therefrom; and regulating the flow of each propellant fluid being discharged from each conventional pressure regulator by method of:

providing a housing defining a chamber containing a sealed and pressurized bellows, said bellows in heat exchange communication with any of said propellant fluid flowing through the chamber, said bellows containing a control gas with the same or similar thermodynamic characteristics as the propellant fluid being regulated, the bellows being connected with and adapted to change the position of a poppet also located within the chamber, such positional changes in said poppet being in response to changes in the elongation of the bellows, an end of said poppet terminating with a poppet head, said housing having an entrance opening for introducing a flow of said propellant fluid from said conventional pressure regulator into said chamber and an exit opening for allowing a flow of said propellant fluid out of said chamber; and flowing the propellant fluid being discharged from said conventional pressure regulator through said entrance opening and into said chamber, said flow into said chamber being throttled by the disposition of said poppet head within said entrance opening, said poppet head and a housing surface forming said entrance opening cooperating to form a fluid passageway, the area of said fluid passageway being effected by the position of the poppet head therewithin; whereby, when the mass flow rate through said chamber is effected by a change in temperature a corresponding pressure change takes place in said sealed bellows thus repositioning said poppet accordingly and resulting in a substantially constant mass flow rate of said propellant fluid to said rocket combustor.

2. The method of claim 1 wherein said poppet head has an upper portion which is tapered so as to provide a variable flow area as the bellows elongates or contracts.

3. The method of claim 2 wherein said housing surface which forms said entrance opening is tapered to facilitate creation of said variable flow area.

4. The method of claim 3 further including means for pressurizing said bellows.

5. The method of claim 3 wherein said poppet head has a circular cross-section.

6. The method of claim 5 wherein said housing surface forming said opening is circular, the flow passageway being formed having an annular shape.

7. The method of claim 1 further including the step of biasing the poppet toward an open position.

8. The method of claim 1 further including the step of flowing the propellant fluid being discharged from said conventional pressure regulator into a second chamber prior to flowing it into the first chamber provided in claim 1, said second chamber located adjacent the first chamber, said housing surface which forms said entrance opening partitioning the first chamber from said second chamber, said second chamber providing means for biasing the poppet toward an open position.

9. The method of claim 8, wherein said means for biasing the poppet toward an open position includes providing:

a shaft having a first end connected to said poppet head, said shaft extending into said second chamber;

an adjusting nut threaded onto a second end opposite the fist end of said shaft; and a spring coaxially wound about said shaft, said spring opposing said nut at one end and opposing a portion of said housing at another end.

10. A propellant feed system for a bi-propellant, pressure-fed rocket engine utilizing a fuel propellant and an oxidizer propellant, said feed system for maintaining a substantially constant mass flow rate of each propellant fluid into a rocket combustor during the process of propellant consumption, each propellant fluid being stored in a respective storage tank under high pressure and low temperature for maximizing the propellant densities, each propellant tank being externally heated to increase the tank pressure, thus compensating for the pressure losses resulting from the discharge of propellant fluid therefrom; comprising:

conventional pressure regulation means for regulating the pressures of the flows of said propellants being discharged from said tanks, at respective constant pressures;

means for self-regulating the mass flow rate of each propellant fluid after its discharge from said conventional pressure regulation means, including:

a housing defining a chamber for containing a volume of said propellant fluid, said housing having a surface forming an entrance opening for introducing a supply of propellant fluid from said conventional pressure regulation means to said chamber and an exit opening for providing for discharge of the propellant fluid from said chamber;

a sealed and pressurized bellows contained within said chamber, said bellows in heat exchange communication with propellant fluid flowing through said chamber, said bellows containing a second fluid with the same or similar thermodynamic characteristics as the propellant fluid being regulated; and a poppet located within said chamber, said poppet being attached to and adapted to change its position in response to changes in the elongation of said bellows, an end of said poppet terminating with a poppet head which extends into said entrance opening, the housing surface forming said entrance opening and said poppet head cooperatively defining a fluid passageway, the area of said fluid passageway being effected by the position of the poppet head; whereby when the mass flow rate through said chamber is effected by either a change in pressure or a change in temperature, a corresponding change takes place in said sealed bellows thus repositioning said poppet accordingly and resulting in a substantially constant mass flow rate of said propellant fluid to said rocket combustor.

11. The system of claim 10 wherein said poppet head has an upper portion which is tapered so as to provide a variable flow area as the bellows elongates or contracts.

12. The system of claim 11 wherein said housing surface which forms said entrance opening is tapered to facilitate the formation of said variable flow area.

13. The apparatus of claim 12 further including means for pressurizing said bellows.

14. The apparatus of claim 12 wherein said poppet head has a circular cross-section.

15. The apparatus of claim 14 wherein said housing surface forming said opening is circular, the flow passageway being formed having an annular shape.

16. The apparatus of claim 10 further including a spring bias means for biasing said poppet toward an open position.

17. The apparatus of claim 16 wherein said housing further defines a second chamber, said second chamber located adjacent the first chamber, said housing surface which forms said entrance opening partitioning the first chamber from said second chamber, said second chamber containing said spring bias means.

18. The apparatus of claim 17 wherein said spring bias means includes:

a shaft having a first end connected to said poppet head, said shaft extending into said second chamber;

an adjusting nut threaded onto a second end of said shaft; and a spring coaxially wound about said shaft, said spring opposing said nut at one end and opposing a portion of said housing at another end.

* * * * *